Figure 1:
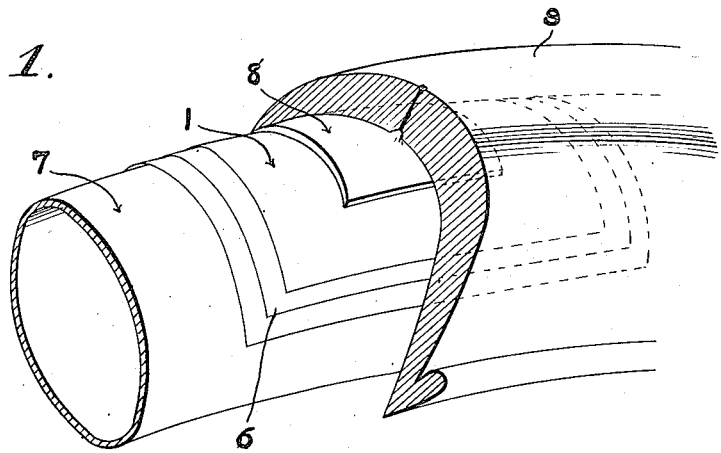
Figure 2:
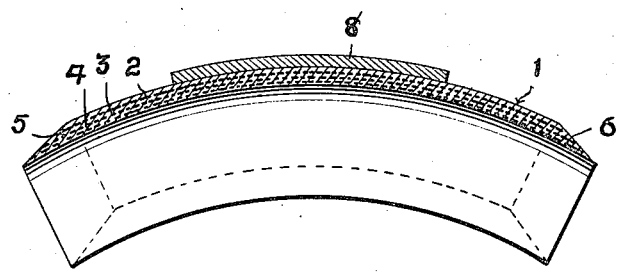
Figure 3:
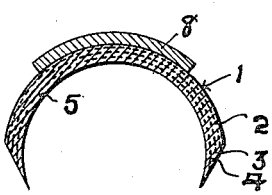

June 10, 1924.                     1,497,130
R. J. BELL
REPAIR PATCH FOR PNEUMATIC TIRES
Filed April 13, 1922

Inventor
Robert J. Bell,
By Arthur Scrivener.
Attorney.

Patented June 10, 1924.

1,497,130

UNITED STATES PATENT OFFICE.

ROBERT J. BELL, OF RICHMOND, VIRGINIA, ASSIGNOR TO VIRGINIA-CAROLINA RUBBER COMPANY, OF RICHMOND, VIRGINIA, A CORPORATION OF VIRGINIA.

REPAIR PATCH FOR PNEUMATIC TIRES.

Application filed April 13, 1922. Serial No. 552,256.

*To all whom it may concern:*

Be it known that I, ROBERT J. BELL, a citizen of the United States, residing at Richmond, in the county of Henrico and State of Virginia, have invented certain new and useful Improvements in Repair Patches for Pneumatic Tires, of which the following is a specification, reference being had therein to the accompanying drawing.

My invention relates to plaster patches for repairing punctures, cuts or slits in automobile tire casings; and it has for its object the providing of a formed patch base which will neatly fit at all points to the inner face of a casing without wrinkles or ridges, so that it may adhere closely to the casing and at the same time not injure the inner tube. It has also for its object the providing of a patch having a base as strong as that of the casing itself.

I am aware that patches intended for repairs to casings have been made. Such patches have been of a flat type, usually of one size, and intended for use in all sizes of casings; and the adhering substance has been in one flat sheet, intended not only to adhere to the inner face of the casing, but also to close the cut in the casing. But a flat patch cannot fit to the surface of a cylindrical ring, which is the form of a casing; and a single size of patch cannot fit all sizes of casings. A sheet of rubber or of compound cannot be the adhesive medium between patch and casing and at the same time close and fill the cut in the latter, for the rubber immediately adjacent to the cut would hold back the rubber opposite the cut and prevent it from penetrating the cut. If the cut be not well filled, or at least plugged, gravel, dirt, grit and stones will enter and soon pierce the patch. This has been found to be the case with flat patches now on the market. It is also very desirable that the patch base be strong, fit closely, and it is important that it have sufficient body to form a support to the injured casing; for it is manifest that until the cement has secured the patch to the casing, and the heat due to running has caused the rubber or compound to seal the cut in the casing, it is the base of the patch only which gives any support to the injured member.

Furthermore it is desirable that the inner face of the patch be even and free from ridges of any kind, lest the inner tube be injured; and for this reason again it is important and necessary that the patch have the same geometric form as the casing. It is therefore my further object to provide formed bases of suitable sizes to fit several sizes of casings neatly and snugly; the bases being of a strongly woven fabric incorporated with rubber or similar compound, and coated with a strongly adhering cement; and carrying upon its outer surface a substantial block or slab of uncured or unvulcanized rubber compound which when subjected to pressure and heat will penetrate the cut in the casing, and adhere to the faces of the cut, and become vulcanized and so form an effectual repair of the tread surface and at the same time prevent the ingress of road grit.

In the drawings, which form a part of this specification: Fig. I shows my plaster patch in perspective, in position in a casing, a part of the casing being cut away to allow the patch to be seen. Figs. II and III show the patch in longitudinal section and cross section, respectively; in which sections the thickness of the patch is shown on a larger scale than the length and width of the patch in order that the construction of the patch base may be clearly seen.

In the several figures: the base 1 of the patch is formed of the several layers 2, 3, and 4 of closely woven fabric, incorporated in the elastic material 5, such as rubber or rubber compound. I do not confine myself to a three layer construction. The fabric may be used in one or more layers; but more than one is to be preferred on account of strength. The several layers are at first of the same area; but after they are incorporated with the rubber or compound to form the patch base, the edges of this base are skived or bevelled to a thin edge as at 6, 6; with the result that the base fits closely, and without any ridges or square edges, to the inner face of the tire casing 9; and so presents no abrupt and projecting surfaces to the inner tube, 7.

The outside of the base is coated with a rubber cement by means of which the base becomes securely attached to the inner face of the tire casing. On the back or convex side of the base is mounted, and secured with cement, a slab or block of uncured or unvulcanized rubber compound 8. This block may be made of any shape or size; and its position is adjustable on the base so that it may correspond with the location of the cut in the tire casing, while the base of the patch remains in its proper relation to the casing as a whole.

Upon a casing being cut, the inner tube is partly or wholly deflated and the side of the casing released from the rim. The patch is then slipped into place around the inner tube at the point of injury; the side of the casing is replaced; and the tire is inflated. The air pressure will hold the patch securely in place until the warmth due to compressing the air, and that due to road friction, cause the cement on the patch base to adhere to the inside of the casing, which it now snugly fits. The air pressure and the rising warmth due to running will also cause the block of uncured rubber compound 8 to enter and seal or plug the cut in the casing.

The importance of the fabric core of the patch will be seen when one remembers that the shoe or casing is the only shield between a delicate rubber tube and the harshest of roads. This feature of the patch lends it to another use. There are times when a casing may not be punctured or actually cut through, but when it has been so worn or damaged as to endanger the inner tube. Then I insert my patch, sometimes with the block of uncured rubber removed, or reduced in thickness, and the strong fabric-cored elastic base of the patch forms an effectual support, and actually affords an extra thickness of material of a construction similar to that of the casing itself. The adjustable feature of the block is of value, as, no matter where the cut, the uncured rubber block can be adjusted to close it without changing the position of the patch relatively to the casing.

Having described my invention, what I claim and desire to protect by Letters Patent of the United States, is:

1. A pneumatic tire patch comprising a base consisting of a plurality of layers of rubberized fabric shaped to the inner curvature of a tire casing, and a block of uncured rubber mounted on the base and adapted to penetrate an opening in a tire and adhere to the walls of the opening.

2. A pneumatic tire patch comprising a rubberized fabric base shaped to the inner curvature of the tire casing, and a block of uncured rubber compound adjustably mounted on the base.

3. A pneumatic tire patch comprising a rubberized fabric base, the said base being conformed to the curvature of the inner face of the casing, a cementitious means for securing the base in place in the casing, and a block of plastic material adjustably mounted on the base.

4. A tire casing repair patch comprising a relatively small rubberized fabric base adapted to fit within the casing and to cover a perforation therein, and a layer of uncured rubber mounted on the base and arranged to cover the perforation and adapted to enter the perforation when subjected to the pressure of the air within the inner tube, and also adapted when subjected to the said pressure and the heat incident to running to fill the perforation and adhere to its walls.

5. A tire casing repair patch comprising a relatively small rubberized fabric base adapted to fit within the casing and to cover a perforation therein, and a layer of uncured rubber mounted on the base and arranged to cover the perforation and adapted when subjected to pressure and heat to fill the perforation.

6. A tire casing repair patch comprising a relatively small rubberized fabric base adapted to fit within the casing and to cover a perforation therein, and a layer of uncured rubber mounted on the base and arranged to cover the perforation and adapted when subjected to pressure to fill the perforation.

In testimony whereof I have hereunto affixed my signature.

ROBERT J. BELL.